Jan. 13, 1925.
C. H. HAPGOOD
1,522,623
PENDULUM LOCKING DEVICE FOR WEIGHING SCALES
Filed Dec. 29, 1922
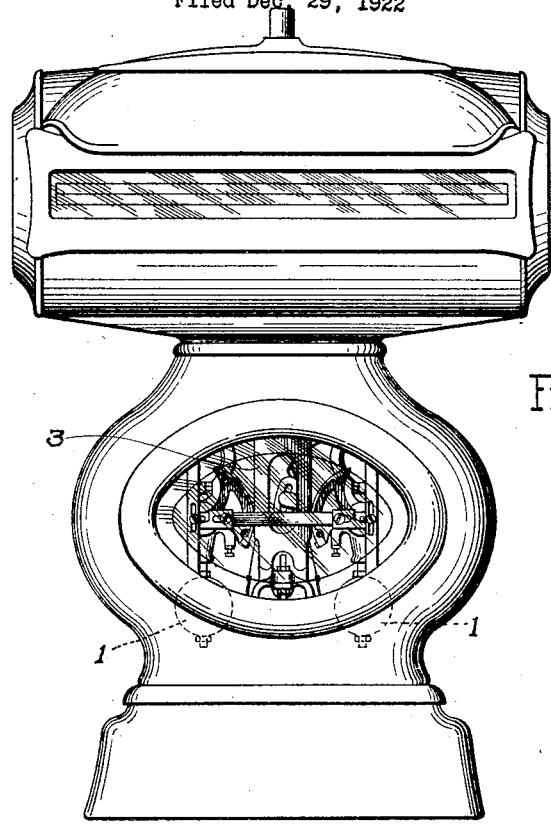
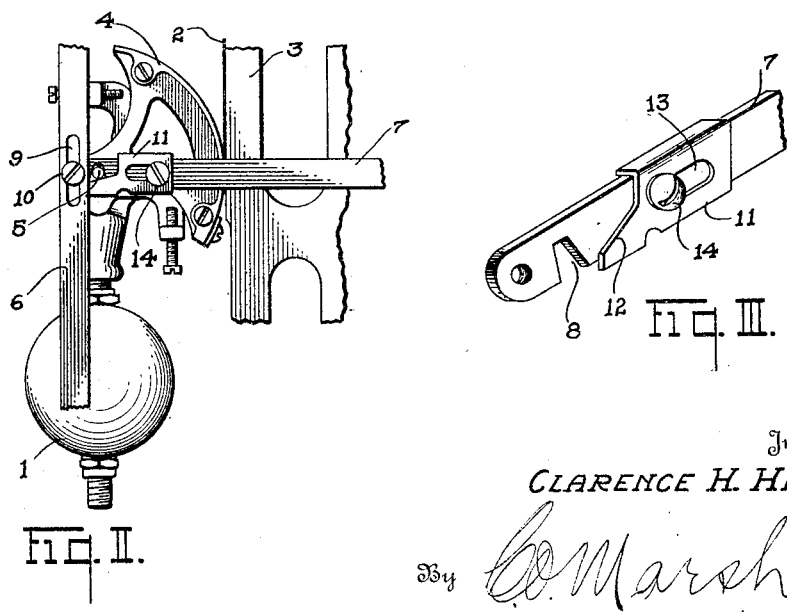
Inventor
CLARENCE H. HAPGOOD
By CO Marshall
Attorney

Patented Jan. 13, 1925.

1,522,623

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

PENDULUM-LOCKING DEVICE FOR WEIGHING SCALES.

Application filed December 29, 1922. Serial No. 609,584.

*To all whom it may concern:*

Be it known that I, CLARENCE H. HAPGOOD, a citizen of the United States, residing at Toledo, in the county of Lucas and State of Ohio, have invented certain new and useful Improvements in Pendulum-Locking Devices for Weighing Scales, of which the following is a specification.

This invention relates to weighing scales of the type in which the load on the scale is counterbalanced by pendulums, and one of its principal objects is to provide means for locking such pendulums against movement so that the scale may be shipped without injury.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevation of a scale embodying my invention;

Figure II is an enlarged fragmentary elevational view showing the application of my locking device to scale weighing mechanism; and Figure III is a further enlarged fragmentary perspective view showing some of the elements of my locking device.

I have shown the device as applied to a counter scale of the type illustrated and fully described in my co-pending application Ser. No. 433,922, filed December 29, 1920, in which loads are counterbalanced by a pair of oppositely swinging pendulums 1 suspended by means of flexible metallic ribbons 2 which normally lie against the vertical faces of a sector guide 3. The parts 4 of the pendulums to which the ribbons 2 are connected are arcuate in shape and are usually called fulcrum sectors, because, as the pendulums swing outwardly in counterbalancing a load, the fulcrum sectors roll upwardly on the ribbons 2 which lie against the vertical faces of the sector guide 3. Formed upon the pendulums in line with the centers of curvature of the fulcrum sectors 4 are projecting lugs 5 which move vertically upwardly as the pendulums 1 swing outwardly, and secured to the frame of the scale and lying adjacent to but normally out of contact with the lugs 5 are vertically extending guard bars 6. These guard bars prevent the fulcrum sectors 4 from swinging away from the sector guides 3 to any considerable distance by engaging the lugs 5 so that the scale can be moved about the place in which it is used without liability to such derangement as might result if the pendulums were free to flop about. When the scale is to be shipped, however, it is necessary that the pendulums be firmly and reliably held against any movement whatever.

When it is desired to absolutely lock the pendulums, a crossbar 7 having notches 8 adjacent its ends is secured to the guard bars 6 with the notches 8 in engagement with the lugs 5. The guard bars 6 are provided with vertical slots 9 adapted to receive screws 10 which are threaded into holes in the ends of the crossbar 7. Since the screw 10 may be moved upwardly and downwardly in the slot 9, the crossbar may be pushed down until the walls of the notch 8 are firmly engaged with the lugs 5 and the ribbons 2 are taut before the screws 10 are turned up to clamp the crossbar in place. Slidably mounted on the crossbar 7 is a clip 11 having an inclined edge 12 adapted, when the clip is slid toward the end of the bar, to engage the lower side of the lug 5 and thus retain the lug firmly seated in the notch 8. The clip 11 may be clamped in place by the screw 14 passing through a slot 13 in the clip. With the crossbar in the position shown in Figure II the pendulum is firmly held against movement.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, in combination, a pendulum, a projection on said pendulum, a guard member adapted to co-operate with said projection for preventing excessive displacement of said pendulum, a locking member engageable with said projection, and means for securing said locking member to said guard member.

2. In a device of the class described, in combination, a frame, a flexible member connected thereto, a pendulum supported by said flexible member, a guard member for preventing excessive displacement of said pendulum, a locking member engageable with said pendulum, and means for fastening said locking member to said guard member for firmly holding said pendulum against movement.

3. In a device of the class described, in combination, a frame, a flexible member connected thereto, a pendulum supported by said flexible member, a projection on said pendulum, a guard member lying adjacent said projection and adapted to engage said projection to prevent excessive displacement of said pendulum, a locking member engageable with said projection, and means for fastening said locking member to said guard member.

4. In a device of the class described, in combination, a frame, a flexible member connected thereto, a pendulum supported by said flexible member, a projection on said pendulum, a guard member lying adjacent said projection and adapted to engage therewith to prevent excessive displacement of said pendulum, a locking member having a notch adapted to engage said projection, and means for adjustably securing said locking member to said guard member whereby said pendulum is firmly locked against movement.

5. In a device of the class described, in combination, a frame, a flexible member connected thereto, a pendulum supported by said flexible member, a projection on said pendulum, a guard member lying adjacent said projection and adapted to engage therewith to prevent excessive displacement of said pendulum, a locking member having a notch adapted to engage said projection, means for holding said projection in said notch, and means for adjustably securing said locking member to said guard member whereby said pendulum is firmly locked against movement.

6. In a device of the class described, in combination, a frame, a pair of flexible members connected thereto, a pair of pendulums supported by said flexible members, each of said pendulums having a projection, guard members interposed adjacent said projections and adapted to engage therewith to prevent excessive displacement of said pendulums, a locking bar adapted to engage said projections, and means for securing said bar to said guard members.

7. In a device of the class described, in combination, a frame, a pair of flexible members connected thereto, a pair of pendulums supported by said flexible members, each of said pendulums having a projection, guard members interposed adjacent said projections and adapted to engage therewith to prevent excessive displacement of said pendulums, a locking bar having notches adapted to engage said projections, and means for adjustably securing said locking bar to said pendulums.

CLARENCE H. HAPGOOD.

Witnesses:
FRANCES DOYLE,
H. O. ERNSBERGER.